June 13, 1933.   W. C. SCHEU   1,913,568
ORCHARD HEATER
Filed Feb. 18, 1931
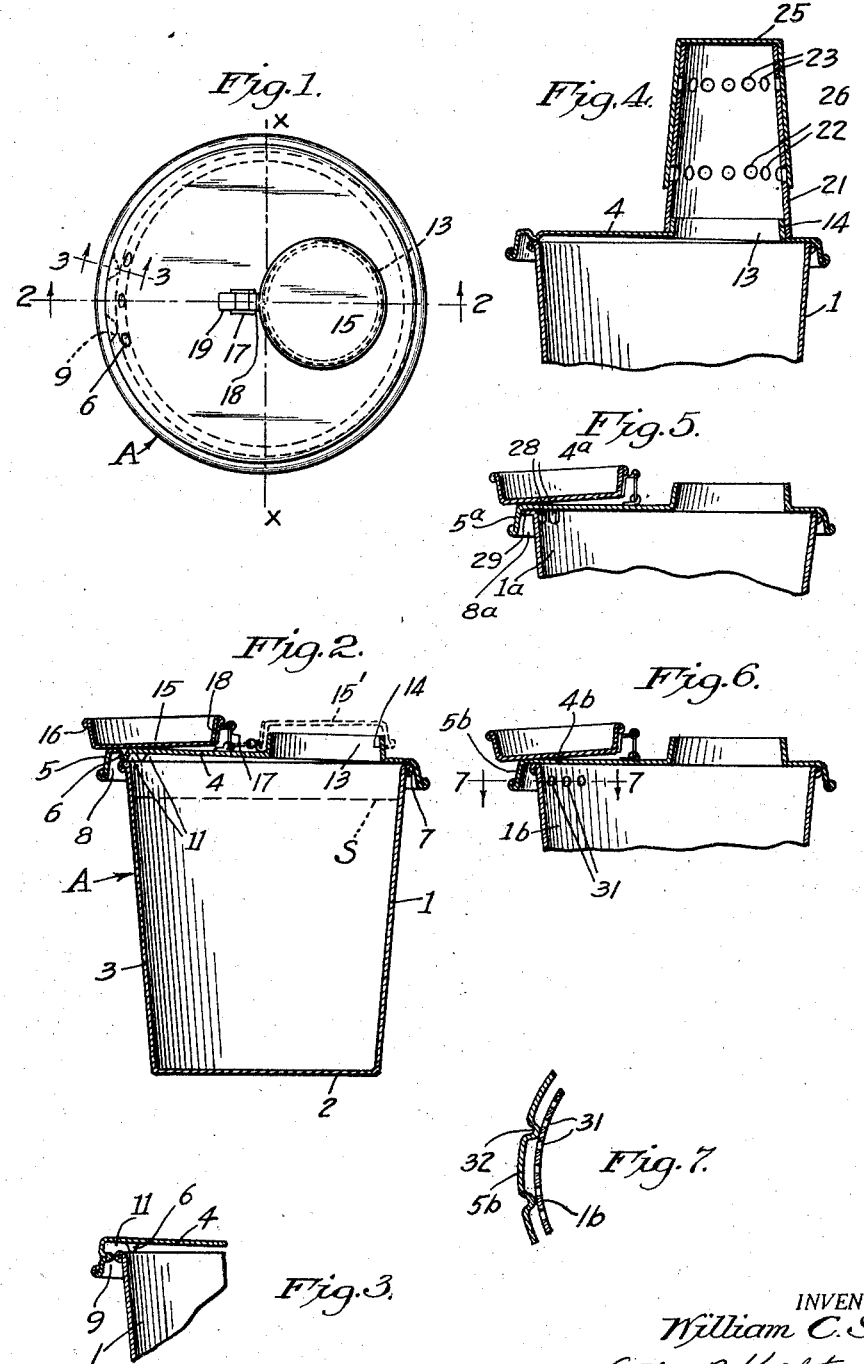
INVENTOR.
William C. Scheu,
BY
ATTORNEYS Patented June 13, 1933

1,913,568

UNITED STATES PATENT OFFICE

WILLIAM C. SCHEU, OF UPLAND, CALIFORNIA, ASSIGNOR TO SCHEU PRODUCTS COMPANY LIMITED, OF ONTARIO, CALIFORNIA, A CORPORATION OF CALIFORNIA

ORCHARD HEATER

Application filed February 18, 1931. Serial No. 516,613.

This invention relates to orchard heaters adapted for the production of heat by combustion of oil or other liquid fuel, and an important object thereof is to provide an orchard heater which is extremely simple and economical in construction and which is, at the same time, adapted for efficient and economical operation.

A particular object of the invention is to provide an orchard heater having improved means for introduction of air into the fuel receptacle for maintaining a generating flame therein and for protecting such air admitting means from entrance of rain therethrough to the interior of the fuel receptacle and also for preventing direct access of wind or other atmospheric disturbances to the air admitting means.

A more specific object of the invention is to provide means for admitting air to the fuel receptacle through one or more air admitting openings or passages beneath the cover of said receptacle, and to provide said cover with means shielding said air admitting opening or openings.

A further object of the invention is to provide an orchard heater having a burner opening in the cover thereof and advantageous means for closing said burner opening when the heater is not in use, so as to prevent access of rain therethrough to the interior of said receptacle.

The orchard heater of my invention comprises essentially a fuel receptacle, a cover extending over the upper end of said receptacle and provided with a burner opening, said heater being provided with one or more air admitting openings beneath the cover at one side of the heater, and said cover being provided with shield means extending downwardly from adjacent its periphery and outside or in front of said air admitting opening or openings. The interior of said fuel receptacle is substantially free from obstruction between the air admitting openings and the burner opening, and the burner opening in the cover is preferably spaced from the position of the air admitting openings sufficiently to substantially prevent direct passage of air from said air admitting openings to said burner opening, during operation of the heater and for this purpose said burner opening may advantageously be disposed adjacent the side of the cover opposite the position of the air admitting openings. The air admitting openings may be provided either between the upper edge of the side wall of the fuel receptacle and the cover, or they may be provided in the side wall of the fuel receptacle. The burner opening in the cover may open directly to the atmosphere so as to provide for open combustion of the vapors issuing therethrough, or a stack may be provided extending upwardly from said burner opening so as to provide for more or less enclosed combustion, said stack being of course provided with suitable means for admission of air to the interior thereof. In either case, means are preferably provided for closing the burner opening, or the upper end of the stack, when the heater is not in use. When the stack is omitted and the burner opening communicates directly with the atmosphere, such closure means preferably comprises a closure member hingedly mounted on the cover, in such manner as to permit the same to be moved to position over the burner opening and to a position removed from said opening and resting upon the fuel receptacle cover.

The accompanying drawing illustrates orchard heater constructions embodying my invention, and referring thereto:

Fig. 1 is a plan view of a preferred form of orchard heater, in which the burner opening communicates directly with the atmosphere, the closure means for said burner opening being shown in closed position.

Fig. 2 is a vertical section on line 2—2 in Fig. 1, but with the closure means for the burner opening shown in open position.

Fig. 3 is a partial section on line 3—3 in Fig. 1.

Fig. 4 is a vertical section of an orchard heater similar to that shown in Figs. 1 and 2 but provided with a combustion stack communicating with the burner opening.

Fig. 5 is a vertical section of the upper portion of a heater provided with a modified form of air admitting means.

Fig. 6 is a similar view showing another possible modification in the air admitting means.

Fig. 7 is a partial horizontal section on line 7—7 in Fig. 6.

The orchard heater A shown in Figs. 1 and 2 comprises a receptacle member 1 having imperforate bottom wall 2 and side wall 3 of inverted frusto conical or other suitable shape, and a cover member 4 extending entirely across the upper end of the receptacle member and supported in any suitable manner on the upper edge of the side wall 3. Said cover member is provided at its outer edge with a depending annular flange 5 extending down around the upper edge portion of said side wall. The interior of receptacle 1 is preferably, as shown, substantially free from baffles, partitions, or other internal obstructions.

In this form of the invention one or more air admitting opening or openings are shown as provided between the upper edge of the side wall 3 and the lower face of the cover member 4, at one side of the heater, and in order to space the cover member from the upper edge of the side wall and to provide such openings, I have shown the cover member as provided with a plurality of downward projections 6. Said downward projections are shown as consisting of downwardly projecting bumps formed in the cover member and there may be one or any desired number of such projections. Said projections, however, are relatively close together and are disposed substantially wholly at one side of the heater, and are furthermore so disposed as to rest upon the upper edge of the side wall 3 when the annular flange 5 is in substantially tight engagement with the upper edge of the side wall at the opposite side of the heater, as shown at 7. The inside diameter of the annular flange 5, however, is somewhat larger than the outside diameter of the upper edge of the side wall 3, so that when said cover member is positioned as above described, the annular flange 5 is spaced somewhat from the upper edge of the side wall, as shown at 8, at the side where the downward projections 6 are located. In order to maintain the cover in this position and thus maintain the proper spacing at 8, suitable spacing means are provided, consisting for example of inward projections or bumps 9 formed on the flange 5 and engaging the upper edge portion of the side wall. A plurality of air admitting openings 11 are thus provided between the cover member and the upper edge of the receptacle member and between the projections 6, while the space 8 between and around the projections 9 affords access of air underneath the flange 5 and cover member 4, to said openings.

It will be understood that any other suitable provision may be made for spacing the cover member from the upper edge of the receptacle member at one side of the heater and for spacing the adjacent portion of flange 5 outwardly from the upper edge of the receptacle member while providing the necessary air admitting openings therebetween. The flange 5 extends downwardly below the top of the receptacle member and hence below the air admitting openings 11, so as to effectively shield said openings against entrance of rain therethrough and also against direct access of wind or other atmospheric disturbances which would tend to cause irregular inflow of air therethrough.

The cover member 4 is also provided with a burner opening 13 which is sufficiently removed from the side of the heater at which the air admitting openings are located to prevent or minimize direct passage of air from said air admitting openings to said burner opening and to cause the air admitted through said air admitting openings to pass in sufficiently close proximity to the surface of the fuel in the receptacle for maintaining a generating flame therein, as hereinafter described. For this purpose the burner opening 13 may advantageously be disposed in the portion of the cover member at the opposite side of the center thereof from the position of the air admitting openings. In the particular heater shown in Fig. 1, the burner opening 13 is shown as disposed substantially wholly at the opposite side of the center line $x-x$ from the air admitting openings, said center line extending diametrically with respect to the top of the receptacle member. The cover member 4 is also preferably provided with an annular flange or lip 14 extending upwardly around the burner opening 13 in order to prevent inflow of water from the surface of the cover through said opening, in case of rain, and a closure member 15 is also preferably provided, which is adapted to extend over said burner opening and is shown as provided with a depending annular flange 16 adapted to fit around the flange 14 on the cover when said closure member is moved to closed position, as shown in Fig. 1 and also in dotted lines at 15' in Fig. 2. Said closure member is preferably hingedly mounted on the cover member 4 in such manner as to permit it to swing to the aforesaid closed position or to a position removed from the burner opening and resting upon the cover member 4, as shown in full lines in Fig. 2. For this purpose the closure member is shown as mounted upon the cover by means of a link member 17 which is hingedly connected at one end, as by strap 18 to the closure member and hingedly connected at the other end as by strap 19 to the cover member 4. The point of hinged connection of link 17 to the closure member 15 is adjacent the lower edge of the flange 16 of said closure member, and said link is of a length substantially equal to the height of said flange, so as to permit the closure member to be swung completely over and to rest upon the cover member 4, as shown.

In starting the operation of the above described heater, with the closure member 15 in open position as shown in Fig. 2, fuel oil or other suitable combustible liquid is placed in the heater, so as to fill the receptacle member 1 to a suitable level such as indicated for example at S in Fig. 2. Any suitable means may be employed for initiating the combustion operation. For example, a small amount of gasoline or other readily inflammable liquid may be poured onto the surface of the fuel, and this igniting fluid may then be ignited by means of a lighted torch. The draft thus produced will cause air to be drawn in through the air admitting openings 11 for supporting combustion which will occur partly within the upper portion of the fuel receptacle and partly at or above the burner opening 13. Combustion being thus started, the main body of fuel becomes ignited and burns in the presence of air admitted through the openings 11, so that a small generating flame is maintained at the surface of the fuel adjacent the position of the air admitting openings, and the heat of this generating flame is sufficient to vaporize a portion of the fuel. The vapors thus generated, together with the products of combustion from the generating flame pass through the upper portion of the heater and out through the burner opening 13. In general, after combustion is well started, the fuel is heated sufficiently to cause continuous vaporization therefrom, so that the generating combustion itself consists principally in the burning of vaporized fuel rather than in combustion at the surface of the liquid fuel, and such combustion produces the heat necessary for generating the additional vapors which are required for the main combustion operation at the burner opening. The vapors thus generated, in excess of those which can be burned with the limited supply of air entering through the openings 11 are passed upwardly through the opening 13, where they are burned in the form of an open flame extending upwardly from the burner opening. It will be observed that the admission of air through the openings 11 occurs substantially wholly at the left side of the heater in Figs. 1 and 2, while the outflow of generated vapors to the main combustion zone occurs substantially wholly at the opposite side of the center line x—x, due to the relative positioning of the air admitting openings and the burner opening as above described, and such relative positioning is important in order to maintain proper generation of fuel vapors within the receptacle.

In Fig. 4 I have shown the upper portion of a heater substantially the same as shown in Figs. 1 and 2, but provided with a stack 21 extending upwardly from the burner opening 13 and communicating therethrough with the interior of the fuel receptacle. Said stack may be of any suitable shape and may be connected and supported in any suitable manner. In the drawing, however, said stack is shown as being frusto-conical in shape with a slight inward and upward inclination, with its lower end fitting around the lip 14 on the cover 4 and resting upon said cover. Said stack may be provided with any suitable means for admitting air thereto for combustion, such means being shown as comprising rows of openings or perforations 22 and 23 at any desired levels therein. The stack is also shown as provided with a removable closure member 25 adapted to fit over the upper end thereof and having a side wall 26 adapted to extend down over the openings 22 and 23 so as to prevent access of rain thereto when the closure member is in place. It will be understood that when the heater is to be operated, the closure member 25 is removed.

The operation of this form of heater is substantially the same as above described, with the exception that the vapors generated within the fuel receptacle and passing through the burner opening 13 are burned within the stack and directly above the same, in the presence of air admitted through openings 22 and 23 and the air surrounding the upper end of the stack.

It is to be understood that the above described stack forms no essential part of this invention and that the heater may be provided with any suitable form of stack or may be used without any stack as shown for example in Figs. 1 and 2.

Any suitable means may be provided for permitting the admission of air beneath the cover of the heater at one side thereof and preferably at the side furthest removed from the burner opening. For example, as shown in Fig. 5, the cover member 4a may rest directly upon the upper edge of the fuel receptacle 1a and the air admitting openings may be provided by notches or slots 28 at the upper edge of said receptacle adjacent one side thereof. The necessary outward spacing of the shield member or flange 5a which depends from the edge of the cover member, may be provided by means of lugs or ears 29 bent or struck outwardly from the upper edge of the fuel receptacle between the notches 28. With this construction the air passes upwardly through the space indicated at 8a between the shield or flange 5a and the side wall of the fuel receptacle and then through the openings 28, and the shield 5a serves as before to prevent access of rain or wind to the openings 28.

Another modification is shown in Figs. 6 and 7. In this case also the cover member 4b rests directly on the upper edge of the fuel receptacle 1b and said fuel receptacle is provided with one or more air admitting openings or perforations 31 adjacent the upper edge thereof and at one side of the heater. The flange or shield member 5b projecting downwardly from the edge of the cover member 4b is shown as provided with one or more inward projections 32 adapted to engage the side wall of the receptacle adjacent the position of the openings 31, so as to maintain the proper spacing of said shield member from the wall of the receptacle at this side of the heater.

I claim:

1. An orchard heater comprising a fuel receptacle, a cover extending over the upper end of said receptacle and provided with a burner opening and having a downwardly projecting flange adjacent its periphery, said cover and flange being in tight engagement with the upper edge of said fuel receptacle at one side thereof and said flange being spaced outwardly from the upper edge of the fuel receptacle at the opposite side thereof, and said heater being provided with air admitting openings beneath said cover and above the level of the lower edge of said flange at said last named side of the heater.

2. An orchard heater comprising a fuel receptacle, a cover extending over the upper end of said receptacle and provided with a burner opening adjacent one side thereof, and with a depending peripheral flange, said cover and flange closely engaging the upper edge of said heater at the side adjacent said burner opening, and means spacing said cover and flange upwardly and outwardly from the upper edge of said receptacle at the side opposite said burner opening so as to provide an opening between the cover and the upper edge of the fuel receptacle for admission of air to said fuel receptacle.

3. An orchard heater comprising a fuel receptacle, a cover having a burner opening and extending over the upper end of said receptacle, said cover being provided with a depending peripheral flange, and means spacing said cover and said flange upwardly and outwardly from the upper edge of said receptacle at one side thereof so as to provide an opening between the cover and the upper edge of said fuel receptacle for admission of air to the interior thereof, said depending flange serving to shield said opening.

In testimony whereof I have hereunto subscribed my name this ninth day of February, 1931.

WILLIAM C. SCHEU.